Oct. 27, 1964    S. PAKSWER ETAL    3,153,839
METHOD OF FORMING VACUUM SEALS
Filed Jan. 11, 1962

INVENTORS
Serge Pakswer
James J. Dowd
By John J. Pederson
Atty.

United States Patent Office 3,153,839
Patented Oct. 27, 1964

3,153,839
METHOD OF FORMING VACUUM SEALS
Serge Pakswer, Elmhurst, and James J. Dowd, Chicago, Ill., assignors to The Rauland Corporation, a corporation of Illinois
Filed Jan. 11, 1962, Ser. No. 165,699
4 Claims. (Cl. 29—155.5)

The present invention pertains to a new and improved method of forming a seal between two components of a vessel and is particularly concerned with a novel method of forming a bakeable vacuum tight seal for an envelope of an electron-discharge device to be at least partially evacuated.

In the manufacture of vacuum vessels, such as for instance, envelopes of electron-discharge devices, cathode-ray tubes or the like, which are conventionally composed of two or more separate mating components, these components may be made of materials having either similar or dissimilar thermal properties, such as for instance different coefficients of thermal expansion.

When these thermal properties match each other, the conventional way of sealing the separate components of the envelope is to heat them to an elevated temperature at which the sealing surfaces of these parts are softened while in contact with each other to effect sealing by direct fusion. In some cases, other materials having suitable thermal properties such as for instance low-melting glass frits, or high-melting brazing alloys, can be interposed between these components to effect a seal which remains solid throughout the subsequent high-temperature operations performed on the vacuum vessel of the electron-discharge device. In both cases the requirement of substantially elevated temperatures for the sealing of these components may result in permanent damage to one or more of the components to be joined, for example, impairment of the optical flatness of optical glass windows to be sealed to the glass envelope, impairment of the efficiency of phosphors or other materials deposited on such windows, etc. Techniques are known in the art to avoid such deleterious effects by using high-frequency dielectric heating to effect sealing, but such techniques are rather cumbersome and are applied only in special cases.

When the thermal properties of the materials of which the components of the vessel are made are dissimilar, the problem of sealing these components together becomes more involved since the materials interposed between these components must be of such a nature that a gradual transition takes place between the thermal properties of the two components. Prior processes involving the use of such materials interposed between these components, to provide a gradual transition between the thermal properties, have required a rather complicated assembly procedure which is both time consuming and expensive; glass frits cannot be used in such conditions.

Various means have been proposed in the art to obviate the aforesaid difficulties. It has been proposed to surround the seal between the two components of similar or dissimilar materials with plastic materials which can be polymerized at a relatively low temperature. Such seals have the drawback that they cannot be heated to temperatures substantially exceeding 300° C., because such plastics, if in communication with the inside of the tube, will evolve compounds which are deleterious to the materials inside the envelope such as, for instance cathodes, photoemissive surfaces and the like.

It is also known in the art that two glass components may be sealed by means of indium or indium alloys as the sealing material, these materials being preferably used due to the low vapor pressure and the absence of any poisoning effects of indium. According to this known method, the glass components are joined by compressing the indium or indium alloys between adjoining surfaces of the glass components, whereby the sealing material remains in solid state. But these seals have the disadvantage that they cannot be heated to temperatures higher than the melting temperature of indium or indium alloys because when so heated, the molten indium flows out of or into the envelope.

Accordingly it is an object of the present invention to overcome the above disadvantages and to provide a new and improved method of forming vacuum tight seals which will enable subsequent processing of the device at substantially higher temperatures than the temperatures employed in the sealing process.

It is a further object of the present invention to provide a novel method of forming vacuum tight seals between components made of materials of dissimilar thermal properties and particularly of dissimilar coefficients of thermal expansion.

It is a still further object of this invention to provide a method of forming bakeable leakproof vacuum tight seals for electron-discharge device envelopes, using materials which will not have any poisoning effect on the components within the envelope.

It is another object of the present invention to provide a method of forming vacuum tight bakeable seals which does not require complicated intermediate steps for forming the seals and yet provides an easily applied seal of high strength.

It is still another object of this invention to provide a method of producing a bakeable leakproof vacuum tight seal utilizing sealing means having a relatively low melting point.

The present invention is thus directed to a process of forming, at temperatures below 200° C., a seal between two mating components of an envelope for an electron-discharge device, which process comprises providing the components with abutting matched surfaces, contacting each other through a predetermined contact area and diverging from each other to form a recess outwardly situated with respect to said contact area, placing a protective shield over the joint of the surfaces, placing indium-containing solder having a predetermined melting temperature in close proximity with the recess, melting the solder, forcing the molten solder into the recess until it is substantially filled, and completing the processing of the device including the step of baking the device at temperatures significantly greater than the predetermined melting temperature.

The inventive method is applicable to sealing off envelopes of various types but for convenience will be described relative to a vacuum vessel made of glass having predetermined thermal properties, to which a glass disc, made of glass having different thermal properties, has to be sealed.

The features of the present invention, which are believed to be novel, are set forth with particularity in the appended claims. The invention together with further objects and advantages thereof may best be understood, however, with reference to the following description taken in connection with the accompanying drawing in the several figures of which like reference numerals identify like elements and in which:

Figure 1:
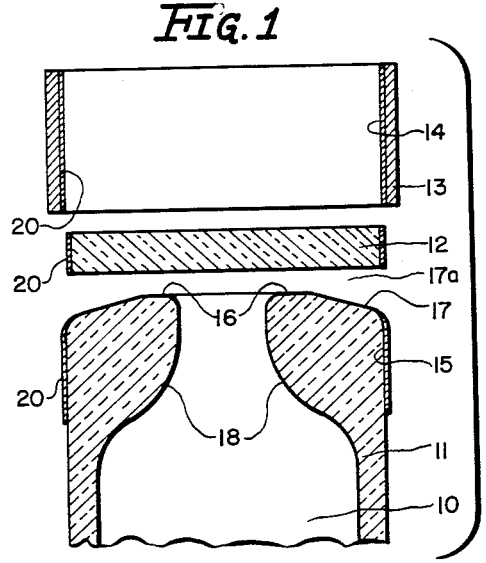
FIGURE 1 is a fragmentary exploded view in cross-section of the end of a vacuum vessel to be sealed to a glass plate closing the opening of the vessel, showing the components of the vessel in a condition before sealing.
Figure 2:
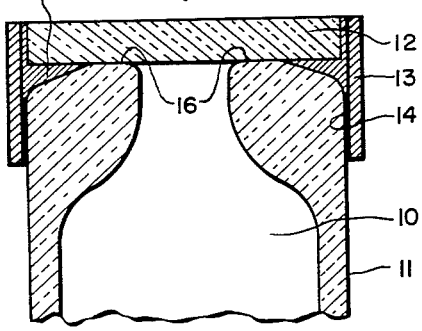
FIGURE 2 is a fragmentary cross sectional view of the glass vessel of FIG. 1 in its sealed condition.
Figure 5:
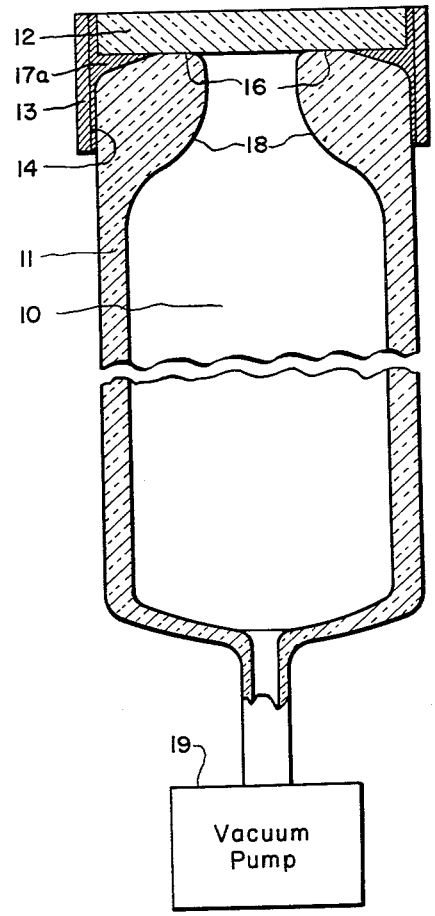
FIGURE 5 shows the vessel attached to a vacuum pump during the sealing process.

As shown in FIGURE 1, a glass disc 12 is to be sealed to an envelope 10 of a glass vessel. For clarity, most of the physical details of the device, which do not directly relate to the present inventions, are omitted. FIGURE 2 shows the glass disc 12 sealed to the glass envelope 10. FIGURES 1, 2 and 5 show a process of forming at temperatures below 200° C. a bakeable vacuum tight seal between two abutting surfaces of two mating components of an envelope 10, made of materials having either similar or dissimilar thermal properties. This process consists in the following: the end-surfaces of the walls 11 of the envelope 10 are preferably provided with a thickened lip 18 to which the glass disc 12 is to be sealed. The surface of the lip 18 is ground flat and thus receives a rough finish. Subsequently, the surface is polished to a higher degree on a polishing wheel, utilizing 240 to 600 mesh silicon carbide grits. A bevel 17 of 2–4° is now ground and polished at the outer edge of the lip 18 over the larger half of the surface of the lip 18, opening outwardly, as shown in FIGURE 1, so that envelope section 11 and faceplate 12 are provided with matched surfaces contacting each other through a predetermined contact area 16 and diverging from each other in a direction outwardly from contact area 16 to form a recess 17a. Finally, both the remaining portions 16 of the lip 18 and the beveled surface 17 of the recess 17a are preferably polished with gamma alumina No. 3, so as to make these surfaces as smooth as possible, to improve the wetting adherance of the sealant within the recess 17a. The flatness of the sealing portions 16 of the surfaces is tested by placing the flat disc 12 onto the polished end-surfaces of the lip 18, connecting the envelope to a vacuum pump 19 and observing the pattern of colors on the flat portion 16.

The glass components to be sealed together are subsequently cleaned with chromic acid, rinsed in de-ionized water and preheated to degas these components at a temperature which is slightly higher than the baking temperature of the envelope. This preheating of the components to be sealed is also an important step of the process, and prevents the formation of pinholes in the seal due to gas evolving from the glass components.

An indium-containing alloy solder material 20 is placed in close proximity to recess 17a, as by brushing on the outer envelope wall.

Different materials can be used for sealing together the surfaces of the envelope but preferably an indium alloy containing 50% indium and 50% tin, known in the art under the tradename "Indalloy No. 1," is used. The Indalloy is heated in a carbon crucible and kept at a temperature of a few degrees above the melting point of same. The Indalloy 14, which is of paste-like consistency, is deposited in close proximity with recess 17a, as by brushing on the sides of the flat disc 12 and the upper outer end surface 15 of the vessel 10; additional Indalloy is also preferably placed on the inside surface of the protective shield 13, and if desired, a small amount may be applied within recess 17a.

The protective shield 13, which is preferably made of a non-magnetic material such as a brass collar of .003–.005" thickness, is placed over the joint of said surfaces onto the envelope 10 as shown in FIGURE 2. The inner diameter of the protective shield 13 is selected in such a manner that the shield 13 will snugly fit the open end of the envelope, and can be pushed over the end of the vessel 10 only when heated.

It should be noted that instead of the protective metal shield a paste made of hard material, which can withstand baking temperatures of over 300° C. such as dental amalgam, special plastic, or the like, may be placed outside the joint of the sealing surfaces after assembly but before sealing.

The so prepared sealing assembly is at least partially evacuated by a vacuum pump 19, and heated in a carbon mold until a temperature is reached at which the Indalloy is liquefied, usually at a temperature of about 130° C. The liquefied solder flows along the side surfaces 14 and 15 and is forced into recess 17a under the pressure differential between the atmosphere and the partial vacuum within envelope 10 until recess 17a is substantially filled. On cooling, a perfect mirror-like surface is formed inside of the recess 17a. If necessary, additional amounts of Indalloy can be added during the sealing process by applying it to the outer surface of the envelope at the lower end of collar 13. Indalloy is preferably used because of its excellent wetting properties which enable the sealing alloy to cover the surfaces to be sealed in a perfect manner, thus producing a durable vacuum-tight seal.

A leakproof seal is obtained because the surfaces to be sealed together are coated with pure Indalloy, and any easily formed oxides of the Indalloy flow out from the recess along the sides 15 of envelope components 11 and 12, floating as a scum out of the actual sealing region inside recess 17a. This important feature assures the provision of a perfect seal between the two glass components. The surplus of the Indalloy and the oxide scum are mechanically removed after cooling by scraping or in any other appropriate manner.

In accordance with a further embodiment of the inventive process, the inner surface of the protective shield 13 is pre-coated with a metal such as tin, which alloys with the indium when heated to a temperature of approximately 160° C. to increase the tin content of the Indalloy, improving the bondage between the protective shield 13 and the sealant and thus strengthening the sealing of the assembly.

The above described example of an embodiment of this invention concerns sealing together two glass surfaces. Obviously, any other materials, such as metals, etc. can be used and, for instance, glass to metal seals can be made.

The inventive arrangement of the seal is also advantageous in permitting the provision of an electrical contact between a member within the envelope and the outside. Such a contact may be made by placing a very thin platinum or other conductive strip extending from the inside of the envelope, between the mating surfaces 16, through the recess 17a, and into contact with shield 13. The Indalloy seal and the protective shield 13 then establish an electric contact between the shield 13 and the conductive strip, which shield 13 may thus serve as an external electrode of the completed tube. Such a conductive strip may be of a thickness of approximately one-half of a light wavelength, which will not disturb the above mentioned color pattern of the mating surfaces 16, thus maintaining the same vacuum tightness as obtained without the application of the conductive strip.

Figure 3:
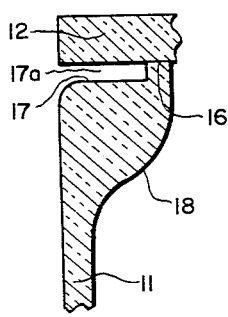
FIGURES 3 and 4 are fragmentary cross-sectional views showing different modifications of the sealing surfaces of the components of the glass vessel.
Figure 4:
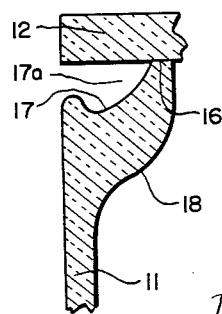

Different modifications of the end-surfaces of lip 18 are shown in FIGURES 3 and 4. The recess 17a in the lip 18 may be of a rectangular configuration as shown in FIGURE 3; or may be provided with a groove-shaped form as indicated in FIGURE 4.

Vacuum tight seals obtained in accordance with the present invention enable baking out of the assembly at temperatures in excess of 300° C. in the subsequent processing of the tube, in accordance with conventional procedures, without disturbing the vacuum tight properties of the seal, since the sealing material cannot enter and contaminate the vessel between polished surfaces 16 of lip 18 and of disc 12 due to the surface tension of the sealant, and cannot flow out due to the provision of the protective shield 13 or the outer coating of hard material paste placed around the joint of the sealing surfaces. Thus, a perfect bakeable vacuum tight seal is formed, capable of withstanding higher temperatures to which the vessel is exposed during further processing.

While a particular embodiment of the present invention has been shown and described, it is apparent that various changes and modifications may be made, and it is therefore intended in the following claims to cover all such modifications and changes as may fall within the true spirit and scope of this invention.

We claim:

1. A process of forming at temperatures below 200° C. a seal between two mating components of an envelope for an electron discharge device, which process comprises: providing said components with abutting matched surfaces, contacting each other through a predetermined contact area and diverging from each other to form a recess outwardly situated with respect to said contact area; placing a protective shield over the joint of said surfaces; placing indium-containing solder having a predetermined melting temperature in close proximity with said recess; melting said solder; forcing said molten solder into said recess until it is substantially filled; and completing the processing of said device including the step of baking said device at temperatures significantly greater than said predetermined melting temperature.

2. A process of forming at temperatures below 200° C. a bakable vacuum tight seal between two mating components, made of materials of dissimilar thermal properties, of an envelope for an electron discharge device, which process comprises: providing said components with abutting, matched sealing surfaces, contacting each other throughout a predetermined contact area and diverging from each other in a direction outwardly situated from said contact area to form a recess; placing a protective shield over the joint of said surfaces; depositing an indium-containing solder having a predetermined melting temperature in close proximity with said recess; melting said solder; producing at least a partial vacuum in said envelope to force said molten solder into said recess until it is substantially filled; and completing the processing of said device including the step of baking said device at temperatures significantly greater than said predetermined melting temperature.

3. A process of fabricating a vacuum tight seal between two glass components of an envelope for an electron discharge device, which method includes: providing said envelope components with abutting matched surfaces contacting each other throughout a predetermined contact area, and diverging from each other to provide a recess outwardly situated with respect to said contact area; placing a tight-fitting protective shield over the joint of said surfaces; placing an indium-containing solder having a melting temperature below 200° C. in close proximity with said recess; heating the assembly to a temperature above the melting tempreature of said solder to change said solder to a molten state, said molten solder having sufficient surface tension to prevent the flow thereof through said matched surfaces into said envelope; at least partially evacuating said envelope to force said molten solder into said recess under the pressure differential created by such evacuation; and completing the processing of said device, including the step of baking said device at temperatures in excess of 300° C.

4. A process for fabricating a vacuum tight seal between two components of an envelope of an electron discharge device, said components having dissimilar thermal expansion coefficients, said process comprising the following steps: providing said envelope components with abutting matched surfaces contacting each other throughout a predetermined contact area, and diverging from each other to provide a recess outwardly situated with respect to said contact area; placing a protective shield over the joint of said surfaces; placing a solder having a predetermined melting temperature in close proximity with said recess; heating the device to a temperature of at least said predetermined melting temperature of said solder to change said solder to a molten state, said molten solder having sufficient surface tension to prevent the flow thereof through said matched surfaces into said envelope; forcing said molten solder into said recess until it is substantially filled; and completing the processing of said device, including the step of baking said device at temperatures greater than said predetermined melting temperature, whereupon said molten solder is retained in said recess by said protective shield to establish a non-rigid seal between said envelope components while the latter are subjected to differential thermal expansions.

References Cited in the file of this patent

UNITED STATES PATENTS

| 369,121 | Patterson | Aug. 30, 1887 |
| 468,298 | White et al. | Feb. 2, 1892 |
| 2,150,379 | Kerschbaum | Mar. 14, 1939 |
| 2,598,338 | Arbogast | May 27, 1952 |
| 2,756,892 | Bleuze et al. | July 31, 1956 |
| 2,868,862 | Petri | Jan. 13, 1959 |
| 2,984,759 | Vine | May 16, 1961 |
| 3,046,651 | Olmon | July 31, 1962 |
| 3,055,096 | Bertossa | Sept. 25, 1962 |

FOREIGN PATENTS

| 883,915 | Germany | July 26, 1943 |
| 732,853 | Great Britain | June 25, 1955 |

OTHER REFERENCES

The Review of Scientific Instruments, vol. 25, No. 2; February 1954; pages 180–183.